United States Patent
Sui et al.

(10) Patent No.: US 8,764,957 B2
(45) Date of Patent: Jul. 1, 2014

(54) WATER TREATMENT USING A BIPOLAR MEMBRANE

(75) Inventors: Caroline Chihyu Sui, Newtown, PA (US); Caibin Xiao, Holliston, MA (US); Hai Yang, Shanghai (CN)

(73) Assignee: General Electric Company, Schenectady, NY (US)

( * ) Notice: Subject to any disclaimer, the term of this patent is extended or adjusted under 35 U.S.C. 154(b) by 437 days.

(21) Appl. No.: 12/977,274

(22) Filed: Dec. 23, 2010

(65) Prior Publication Data

US 2012/0160769 A1    Jun. 28, 2012

(51) Int. Cl.
| | |
|---|---|
| C02F 9/06 | (2006.01) |
| C02F 1/461 | (2006.01) |
| B01D 61/42 | (2006.01) |
| B01D 61/58 | (2006.01) |
| C02F 9/10 | (2006.01) |
| B01D 61/16 | (2006.01) |

(52) U.S. Cl.
USPC ...... 204/538; 210/748.01; 210/650; 210/651; 210/181; 204/534; 165/900

(58) Field of Classification Search
None
See application file for complete search history.

(56) References Cited

U.S. PATENT DOCUMENTS

| | | | |
|---|---|---|---|
| 2,755,245 A * | 7/1956 | Hankison | 137/93 |
| 3,682,190 A | 8/1972 | Patil et al. | |
| 5,094,739 A | 3/1992 | Kump | |
| 5,240,579 A | 8/1993 | Kedem | |
| 5,256,268 A | 10/1993 | Goto et al. | |
| 5,968,338 A | 10/1999 | Hulme | |
| 6,004,445 A | 12/1999 | Genders et al. | |
| 6,132,572 A | 10/2000 | Kim | |
| 6,294,066 B1 | 9/2001 | Mani | |
| 6,482,305 B1 | 11/2002 | Mani | |
| 2001/0040093 A1 | 11/2001 | Mani | |
| 2008/0093213 A1 | 4/2008 | Yamamoto | |
| 2009/0159448 A1 | 6/2009 | Cai et al. | |

FOREIGN PATENT DOCUMENTS

WO    2004/065682    8/2004

OTHER PUBLICATIONS

Search Report and Written Opinion from corresponding PCT Application No. PCT/US2011/063033 dated Apr. 3, 2012.
Tongwen Xu, "Development of bipolar membrane-based processes", Desalination, vol. 140, No. 3, pp. 247-258, Nov. 20, 2001.
Tongwen Xu, "Electrodialysis processes with bipolar membranes (EDBM) in environmental protection—a review", Resources Conservation and Recycling, vol. 37, No. 1, pp. 1-22, Dec. 1, 2002.

* cited by examiner

*Primary Examiner* — Katherine Zalasky
(74) *Attorney, Agent, or Firm* — Wegman, Hessler & Vanderburg

(57) ABSTRACT

A method of water treatment comprising: providing an electrolysis device comprising an electrolysis vessel; providing feed streams to the first salt water chamber of the vessel, second salt water chamber of the vessel, acidic chamber of the vessel, and alkalic chamber of the vessel, the acidic chamber producing an acidic solution and the alkalic chamber producing an alkalic solution; directing at least a portion of the contents of the first and second salt water chambers into a precipitation tank; directing at least a portion of the alkalic solution into the precipitation tank, thereby increasing the pH in the precipitation tank to produce precipitate; and removing the precipitate from the precipitation tank.

4 Claims, 8 Drawing Sheets

WATER TREATMENT USING A BIPOLAR MEMBRANE

BACKGROUND OF THE INVENTION

1. Related Application

U.S. application Ser. No. 12/123,521, filed May 20, 2008, and assigned to General Electric Company, which is herein incorporated by reference.

2. Field of the Invention

This invention is related to the use of an electrolysis device for water treatment.

3. Description of Related Art

The presence of scale forming species in aqueous systems, such as brackish water and cooling tower make up or blowdown, lead to an increase in system maintenance and a decrease in system yield. Accordingly, a need exists to decrease the presence of scale forming species in aqueous systems.

SUMMARY OF THE INVENTION

One embodiment of the present invention concerns a method of water treatment comprising: providing an electrolysis device comprising an electrolysis vessel; providing feed streams to the first salt water chamber of the vessel, second salt water chamber of the vessel, acidic chamber of the vessel, and alkalic chamber of the vessel, the acidic chamber producing an acidic solution and the alkalic chamber producing an alkalic solution; directing at least a portion of the contents of the first and second salt water chambers into a precipitation tank; directing at least a portion of the alkalic solution into the precipitation tank, thereby increasing the pH in the precipitation tank to produce precipitate; and removing the precipitate from the precipitation tank.

Another embodiment of the present invention concerns an electrolysis device comprising a pair of electrodes arranged in the electrolysis vessel, serving as a positive electrode and a negative electrode, respectively; and a cell unit arranged between the positive and negative electrodes, the cell unit comprising a bipolar membrane element and at least one cation exchangeable membrane, the bipolar membrane element having a cation exchangeable side and an anion exchangeable side, the cation exchangeable side being closer to the negative electrode than the anion exchangeable side, the at least one cation exchangeable membrane being arranged between the anion exchangeable side of the bipolar membrane element and the positive electrode, so as to define an alkalic chamber between the bipolar membrane element and the cation exchangeable membrane; wherein the cation exchangeable membrane is selective.

BRIEF DESCRIPTION OF THE DRAWINGS

These and other aspects of the invention will be understood from the description and claims herein, taken together with the drawings showing details of construction and illustrative embodiments, wherein:

DETAILED DESCRIPTION OF THE INVENTION

Figure 1:
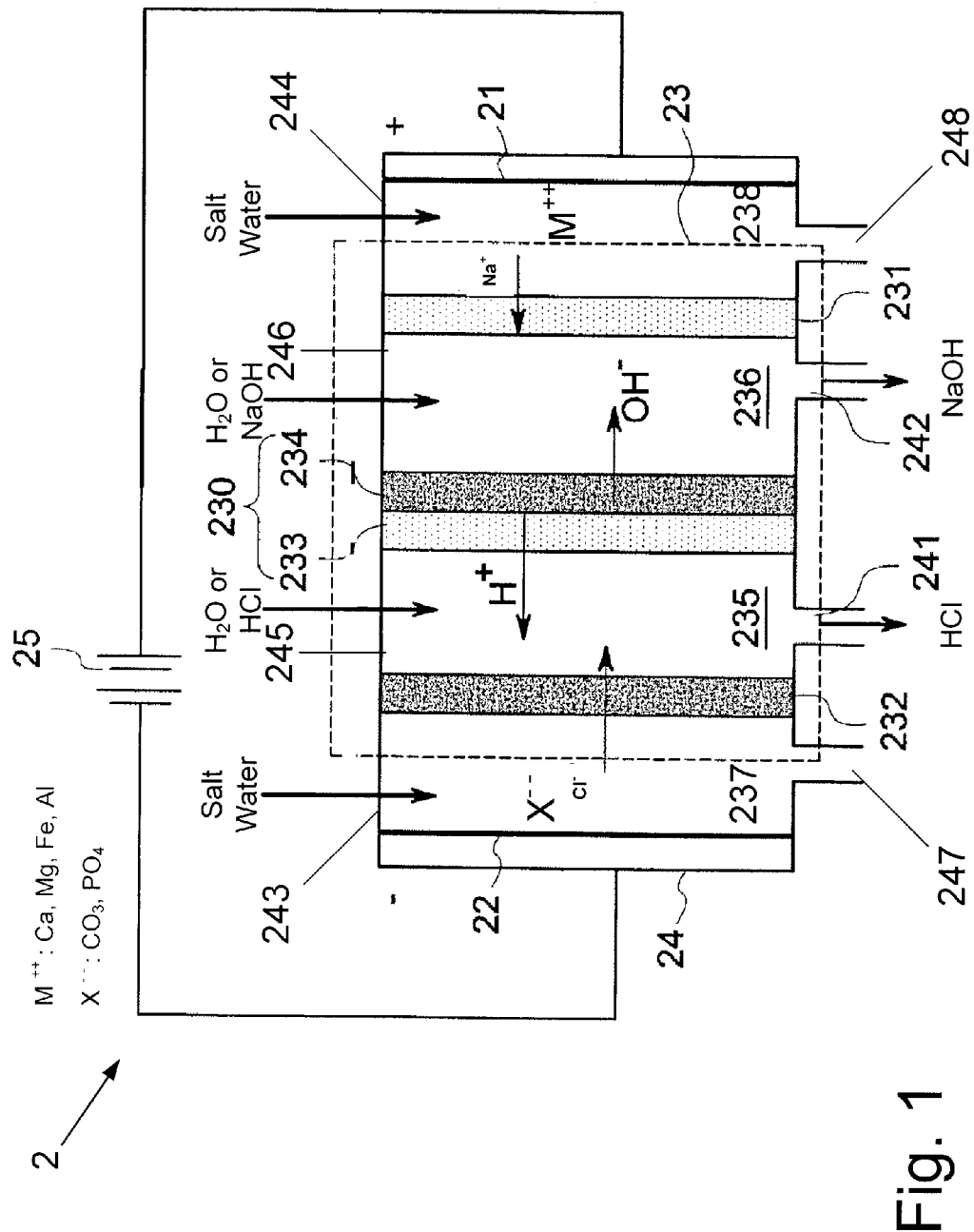
FIG. 1 schematically illustrates one embodiment of the bipolar membrane.

Approximating language, as used herein throughout the specification and claims, may be applied to modify any quantitative representation that could permissibly vary without resulting in a change in the basic function to which it is related. Accordingly, a value modified by a term or terms, such as "about", is not limited to the precise value specified. In at least some instances, the approximating language may correspond to the precision of an instrument for measuring the value. Range limitations may be combined and/or interchanged, and such ranges are identified and include all the sub-ranges stated herein unless context or language indicates otherwise. Other than in the operating examples or where otherwise indicated, all numbers or expressions referring to quantities of ingredients, reaction conditions and the like, used in the specification and the claims, are to be understood as modified in all instances by the term "about".

"Optional" or "optionally" means that the subsequently described event or circumstance may or may not occur, or that the subsequently identified material may or may not be present, and that the description includes instances where the event or circumstance occurs or where the material is present, and instances where the event or circumstance does not occur or the material is not present.

As used herein, the terms "comprises", "comprising", "includes", "including", "has", "having", or any other variation thereof, are intended to cover a non-exclusive inclusion. For example, a process, method, article or apparatus that comprises a list of elements is not necessarily limited to only those elements, but may include other elements not expressly listed or inherent to such process, method, article, or apparatus.

The singular forms "a", "an", and "the" include plural referents unless the context clearly dictates otherwise.

Cooling towers are widely used in industries to remove heat in processes, such as oil refinery, chemical processes, and power generation plants. Cooling towers are also used in the HVAC systems common in commercial, institutional, and hospital buildings. Water consumption in cooling tower operation constitutes the largest water withdrawal from natural water sources in many countries. Water scarcity has become an increasing concern worldwide. According to the data published by Global environment outlook, 5% of population was facing water scarcity problems in 2000, mainly in the middles east area. However, by year 2030, nearly half of world population will be water stressed.

In addition to the limited water resources, environment regulation becomes increasingly restricted to disposal of industrial wastewaters. Cost of treating wastewater before discharge to environment is continuously increased in recent years.

Water shortage worldwide and stringent environment regulations have led to increasing water conservation effort in all industries. Inevitably, it has significant impact on industry water use, especially on huge water consumption industries. Cooling water system conservation efforts have focused on replacing fresh water with treated municipal effluent, reusing plant wastewater, and reducing water discharge by operating at higher cycles of concentration, such as greater than about 7 cycles.

With increasing cycles of concentration, the tendency for deposition increased due to high concentration of Ca, alkalinity, $SiO_2$, silt, Fe, Al, etc. Likewise, the tendency for corrosion increased with increasing cycles due to high conductivity and high concentration of $Cl^-$ and $SO_4^{2-}$.

Common approach to treat cooling towers operating at high cycles is to add acid to reduce alkalinity, operating cooling towers at lower pH, therefore, decreasing the tendency of deposition or precipitation in cooling systems. This usually requires adding a high dose of chemicals such as anionic polymers and corrosion inhibitors to cooling towers. However, handling and storage of strong acid posed a danger to workers and environment, especially in commercial and institutional buildings. Increasing usage of chemicals also results in increasing overall cost of the treatment.

In one embodiment, the present invention is directed toward a method of treating water from cooling towers operating at a high cycle of concentration using an electrolysis device, such as a bipolar membrane or its combination with a nanofiltration unit. Cooling tower water is provided to the electrolysis device. An acidic solution generated from the electrolysis device is added to cooling towers to reduce alkalinity and pH. An alkalic solution generated from the electrolysis device is added to a portion of cooling tower blowdown stream in a separation apparatus to precipitate calcium, silica and other scale forming species. The water after precipitates removal in the separation apparatus is softened and returned to cooling tower. This method allows cooling tower to operate at high cycles of concentration and/or achieve zero liquid discharge, thus significantly reducing water consumption and water treatment chemical usage.

Referring to FIG. 1, a first embodiment of the electrolysis device 2 for producing an acidic solution and alkalic solution includes a pair of electrodes respectively acting as a positive electrode 21 and a negative electrode 22, at least one cell unit 23 between the positive and negative electrodes 21, 22, and a vessel 24 for housing the electrodes 21, 22 and the cell unit 23 therein. The positive and negative electrodes 21, 22 respectively connect with an anode and a cathode of a DC power supply 25. The vessel 24 includes at least a first inlet 243, second inlet 244, third inlet, 245, and fourth inlet 246 for inducing a feed stream to flow through the electrolysis device 2. The cell unit 23 includes at least one alkalic chamber 236 and at least one acidic chamber 235 defined between ion exchangeable membranes, which will be discussed in detail below.

The cell unit 23 of the vessel 24 of electrolysis device 2 according to the first embodiment, shown in FIG. 1, comprises a bipolar membrane element 230, a cation exchangeable membrane 231, and an anion exchangeable membrane 232. The bipolar membrane element 230 has a cation exchangeable side 233 and an anion exchangeable side 234, and is used as a water splitter. The cation exchangeable side 233 of the bipolar membrane element 230 is closer to the positive electrode 21 than the anion exchangeable membrane 232. The cation exchangeable membrane 231 is arranged between the anion exchangeable side 234 and the positive electrode 21. The anion exchangeable membrane 232 is arranged between the cation exchangeable side 233 and the negative electrode 22.

A direct current from the power supply 25 flows through the bipolar membrane element 230 causing the water to split with $OH^-$ ions being produced on the anion exchangeable side 234 and a corresponding number of $H^+$ ions being produced on the cation exchangeable side 233 of the bipolar membrane element 230. The generated $OH^-$ and $H^+$ ions are prevented from moving further by the cation exchangeable membrane 231 and the anion exchangeable membrane 232, respectively.

Cation exchangeable membrane 231 is selective and only passes univalent cationic ions. Anion exchangeable membrane 232 is selective and only passes univalent anionic ions. Accordingly, $Na^+$ ions from the salt water received by second inlet 244 move through cation exchangeable membrane 231 toward the negative electrode 22, while $Ca^{2+}$, $Mg^{2+}$, $Ba^{2+}$, $Fe^{2+}$, $Fe^{3+}$, and $Al^{3+}$ do not move through cation exchangeable membrane 231. Further, $Cl^-$ ions from the salt water received by first inlet 243 move through anion exchangeable membrane 232 toward the positive electrode 21, while $CO_3^{2-}$, $SO_4^{2-}$ and $PO_4^{3-}$ do not move through the anion exchangeable membrane 232.

Thus an alkalic chamber 236 is defined between the bipolar membrane element 230 and the cation exchangeable membrane 231, and an acidic chamber 235 is defined between the bipolar membrane element 230 and the anion exchangeable membrane 232.

A first salt water chamber 237 is defined between negative electrode 22 and anion exchangeable membrane 232. A second salt water chamber 238 is defined between positive electrode 21 and cation exchangeable membrane 231.

A first inlet 243 provides a feed stream to the first salt water chamber 237, a second inlet 244 provides a feed stream to the second salt water chamber 238, a third inlet 245 provides a feed stream to the acidic chamber 235, and a fourth inlet 244 provides a feed stream to the alkalic chamber 236. The feed streams provided to first salt water chamber 237 and second salt water chamber 238 may be comprised of at least one of cooling tower make up water, cooling tower blow down water, or low quality water The vessel 24 further includes an acidic outlet 241 and an alkalic outlet 242 respectively for the alkalic solution of alkalic chamber 236 and the acidic solution of acidic chamber 235 to flow out of. The vessel 24 also includes a first salt water outlet 247 and a second salt water outlet 248 respectively for the salt water of first salt water chamber 237 and second salt water chamber 238 to flow out of.

The feed stream entering the acidic chamber 235 through inlet 245 can be one or both of pure water or the acidic solution exiting acidic outlet 241 of the vessel 24. The feed stream entering alkalic chamber 236 through inlet 246 can be one or both of pure water or the alkalic solution exiting alkalic outlet 242 of vessel 24.

The alkalic solution produced at alkalic outlet 242 can be used to create a high pH environment to precipitate hardness and other species in aqueous systems, such as $CaCO_3$, $CaMg(CO_3)_2$, $Ca_3(PO_4)_2$, $Ca_5(PO_4)_3OH$, $CaSO_4$, $Fe(OH)_3$, $Al(OH)_3$, $MgSiO_3$ etc. The acidic solution produced in acidic chamber 235 can be used to adjust pH of cooling tower water and clean hardness off membranes or electrodes in the vessel 24.

The bipolar membrane element 230 has a water splitting feature to split water directly into $H^+$ and $OH^-$.

The application of the bipolar membrane element 230 greatly improves the efficiency of the electrolysis device 2 for producing alkalic solution and acidic solution from the water. The bipolar membrane element 230 may be a bipolar membrane which includes a cation exchangeable layer and an anion exchangeable layer, or a bipolar module formed by a combination of anion and cation exchangeable membranes which functions as a bipolar membrane.

In one embodiment, the positive and negative electrodes 21, 22 are made from highly porous carbon materials selected from any of activated carbon, carbon black, carbon nanotubes, graphite, carbon fiber, carbon cloth, carbon aerogel, or combination thereof. Surface area of the carbon material is in a range of from about 500 to 2000 square meters per gramme as measured by nitrogen adsorption BET method. high porous positive and negative electrodes 21, 22 each have a shape, size or configuration that is a plate, a block, a cylinder, or a sheet. It is also anticipated that positive and negative electrodes 21, 22 can be made of any metal or porous material deemed suitable by a person having ordinary skill in the art, such as activated carbon.

Figure 2:
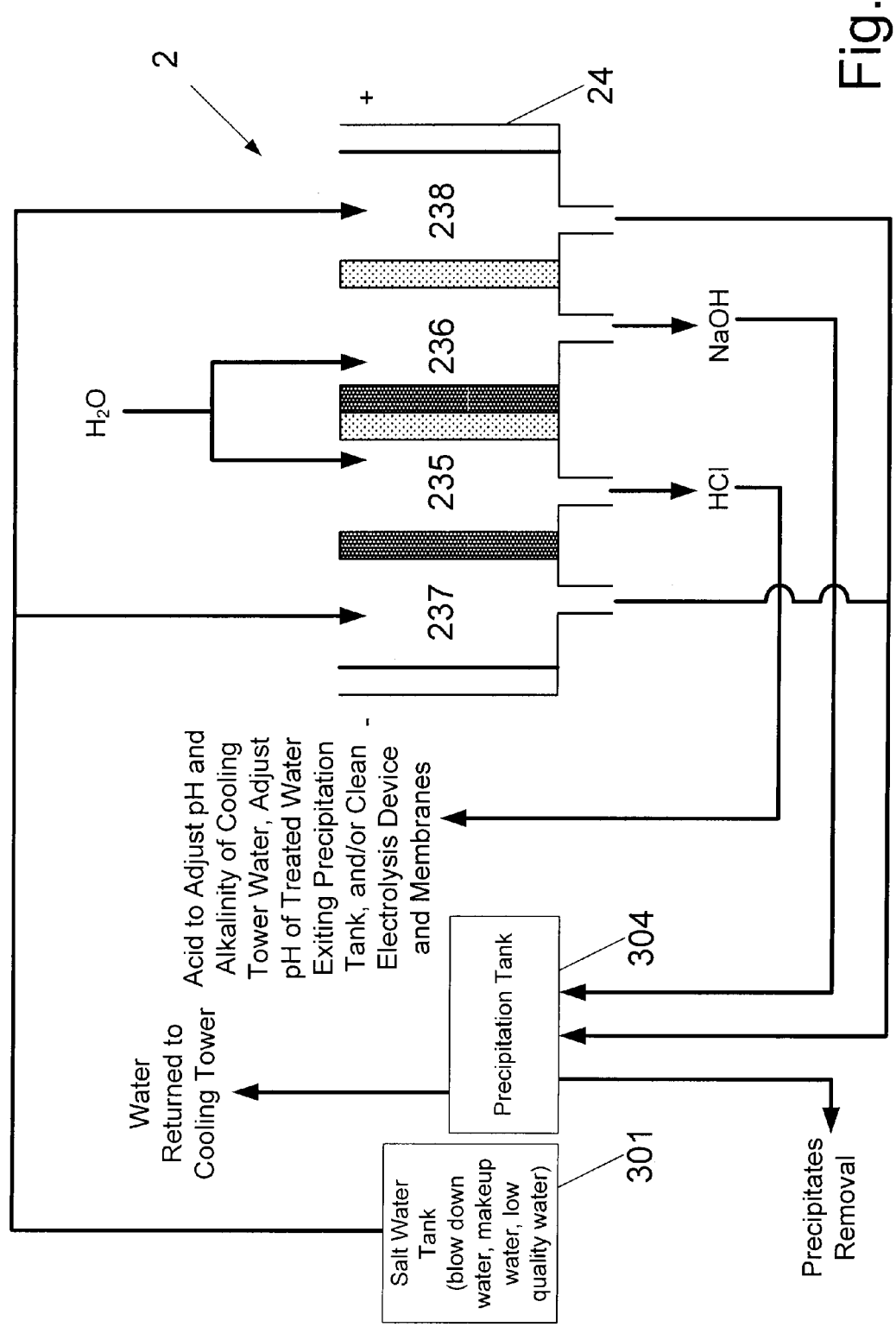
FIG. 2 schematically illustrates a method of operating bipolar membrane of FIG. 1.

FIG. 2 discloses one embodiment in which electrolysis device 2 is used to generate acid solution for cooling tower water pH adjustment or cleaning of electrolysis device 2 and to generate base for hardness precipitation. In this configuration, the output of salt water tank 301 is provided as a feed stream to said first salt water chamber 237 and second salt water chamber 238 of vessel 24. Salt water tank 301 can contain one or more of cooling tower make up water, cooling tower blow down water, or low quality water. Low quality water is any water that needs to be treated to soften and/or remove undesirable ion species, such as brackish water. Water is provided as a feed stream to the acidic chamber 235 and alkalic chamber 236. The output of acidic chamber 235 is provided to cooling towers. The output of alkalic chamber 236 is provided to precipitation tank 304, and the output of the first and second salt water chambers 237 and 238 is also provided to the precipitation tank 304. Accordingly, the addition of the alkalic solution from alkalic chamber 236 into precipitation tank 304 increases the pH in precipitation tank 304 to a desired value to precipitate metal salts and metal hydroxides, such as $CaCO_3$, $MgCO_3$, $CaSO_4$, $Mg(OH)_2$, etc. After the precipitate is removed from precipitation tank 304, the treated water from precipitation tank 304 is provided to a water storage tank or to cooling towers. In one embodiment, the desired pH value in precipitation tank 304 after the addition of alkalic solution from electrolysis device 2 is between about 7 to 14, preferably between about 8 to 13 and more preferably between about 9 to 12.

Figure 3:
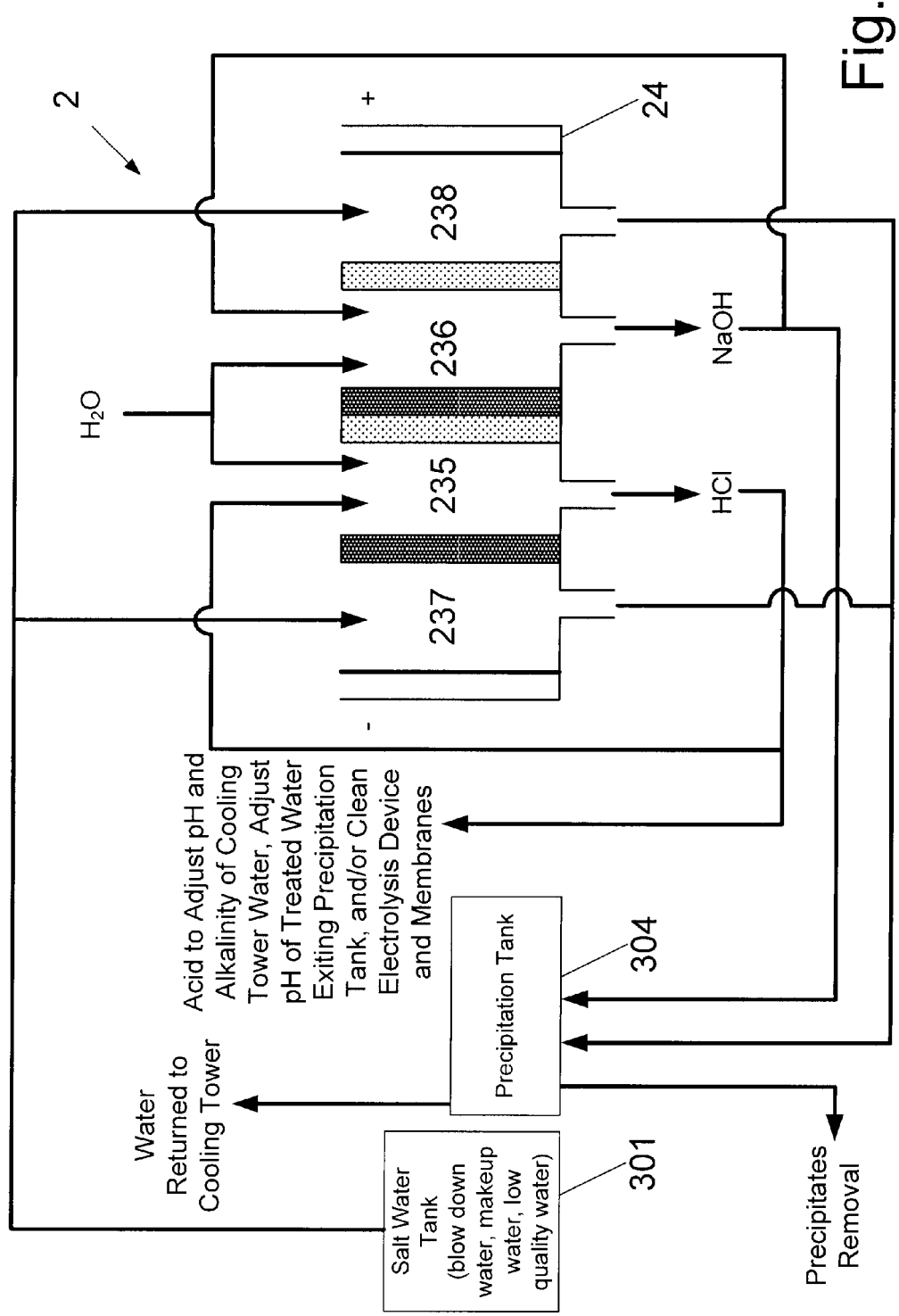
FIG. 3 schematically illustrates a method of operating bipolar membrane of FIG. 1.

Further, as is shown in FIG. 3, it is also contemplated that in some embodiments all or part of the acidic solution produced in acidic chamber 235 can be returned to acidic chamber 235 as a feed stream. Further, all or part of the alkalic solution produced in alkalic chamber 236 can be returned to alkalic chamber 236 as a feed stream. This would allow for the concentration of the acid and base solutions to be increased with time within acidic chamber 235 and alkalic chamber 236. Further, this would allow for the pH within the precipitation tank 304 increases to enhance precipitation.

Figure 4:
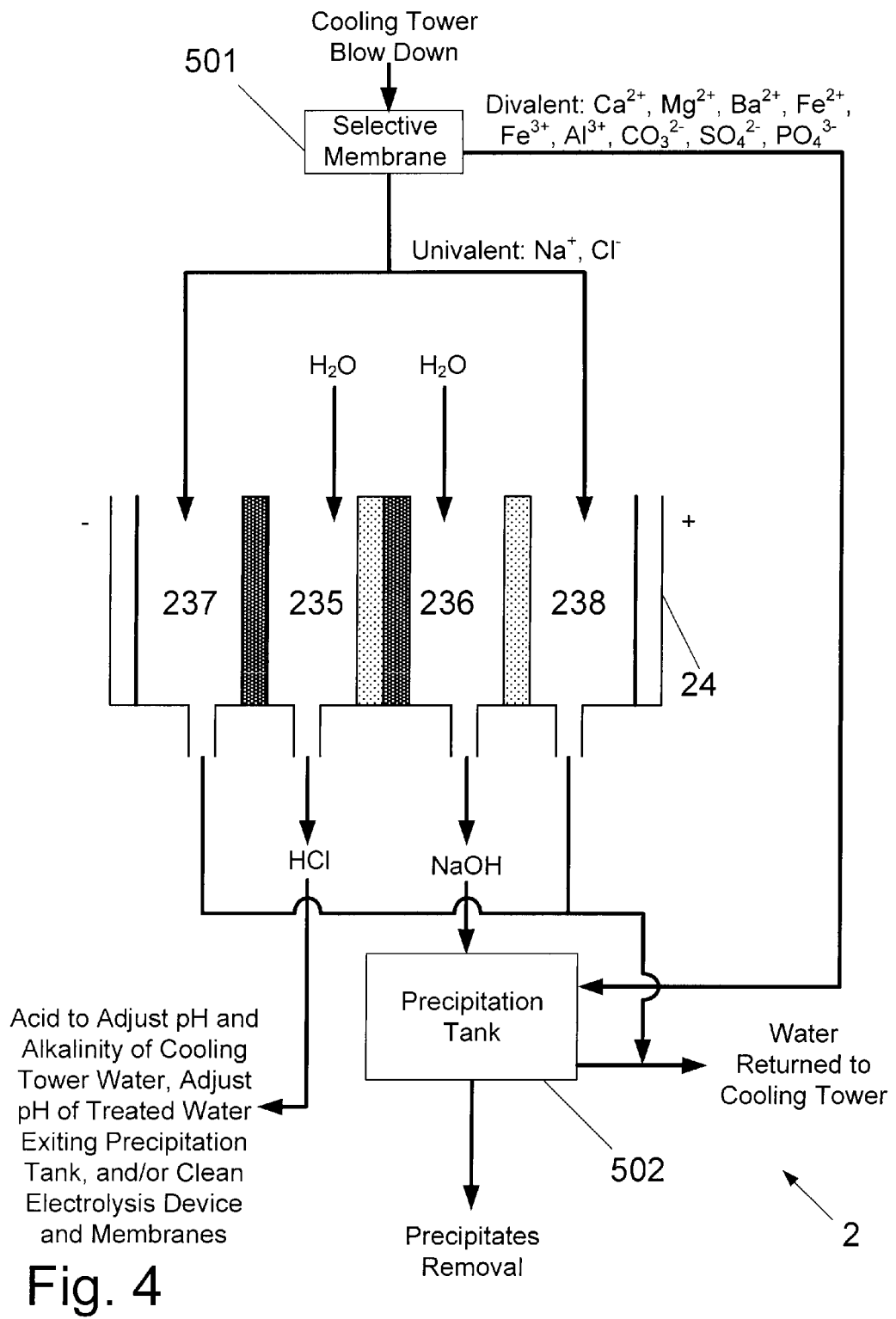
FIG. 4 schematically illustrates a method of operating bipolar membrane of FIG. 1.

FIG. 4 discloses another embodiment in which electrolysis device 2 is used to generate an acidic solution for cooling tower water pH adjustment or cleaning of electrolysis device and to generate a base solution for hardness precipitation. In this embodiment, cooling tower blowdown is delivered to selective membrane 501, which outputs a divalent ion stream that is provided to precipitation tank 502. Selective membrane 501 may be a nanofiltration unit. The divalent ion stream contains one or more divalent ions, such as $Ca^{2+}$, $Mg^{2+}$, $Ba^{2+}$, $Fe^{2+}$, $Fe^{3+}$, $Al^{3+}$, $CO_3^{2-}$, $SO_4^{2-}$ and $PO_4^{3-}$, etc. Selective membrane 501 outputs a univalent ion stream that is provided to the first and second salt water chambers 237 and 238 of vessel 24. The univalent ion stream contains one or more univalent ions, such as $Na^+$, $Cl^-$, etc. Further, a water feed stream is provided to the acidic chamber 235 and alkalic chamber 236 of vessel 24.

The alkalic solution output of the alkalic chamber 236 is provided to the precipitation tank 502, which increases the pH in precipitation tank 502 to a desired value to precipitate metal salts and metal hydroxides, such as $CaCO_3$, $MgCO_3$, $CaSO_4$, $Mg(OH)_2$, etc. In one embodiment, the desired pH value in precipitation tank 304 after the addition of alkalic solution from vessel 24 is between about 7 to 14, preferably between about 8 to 13 and more preferably between about 9 to 12.

The precipitates are then removed from precipitation tank 502 and the remaining treated water contained in precipitation tank 502 is used as cooling tower make up water or for other industrial processes. The output of the first and second salt water chambers 237 and 238 is combined with the remaining treated water from the precipitation tank 302 as cooling tower make up water or for other industrial processes. The acidic solution output of the acidic chamber 235 can be used to adjust pH of cooling tower water and/or adjust the pH of treated water stream exiting from precipitation tank 502, and to clean membranes of vessel 24. Returning the remaining water from precipitation tank 502 to the cooling tower reduces water consumption and reduces or eliminates the waste water discharged to a sewer or river. Further, the use of high quality water in the cooling tower reduces the amount of chemicals required to treat the water in the cooling tower, thus reducing disposal cost and impact on the environment.

Figure 5:
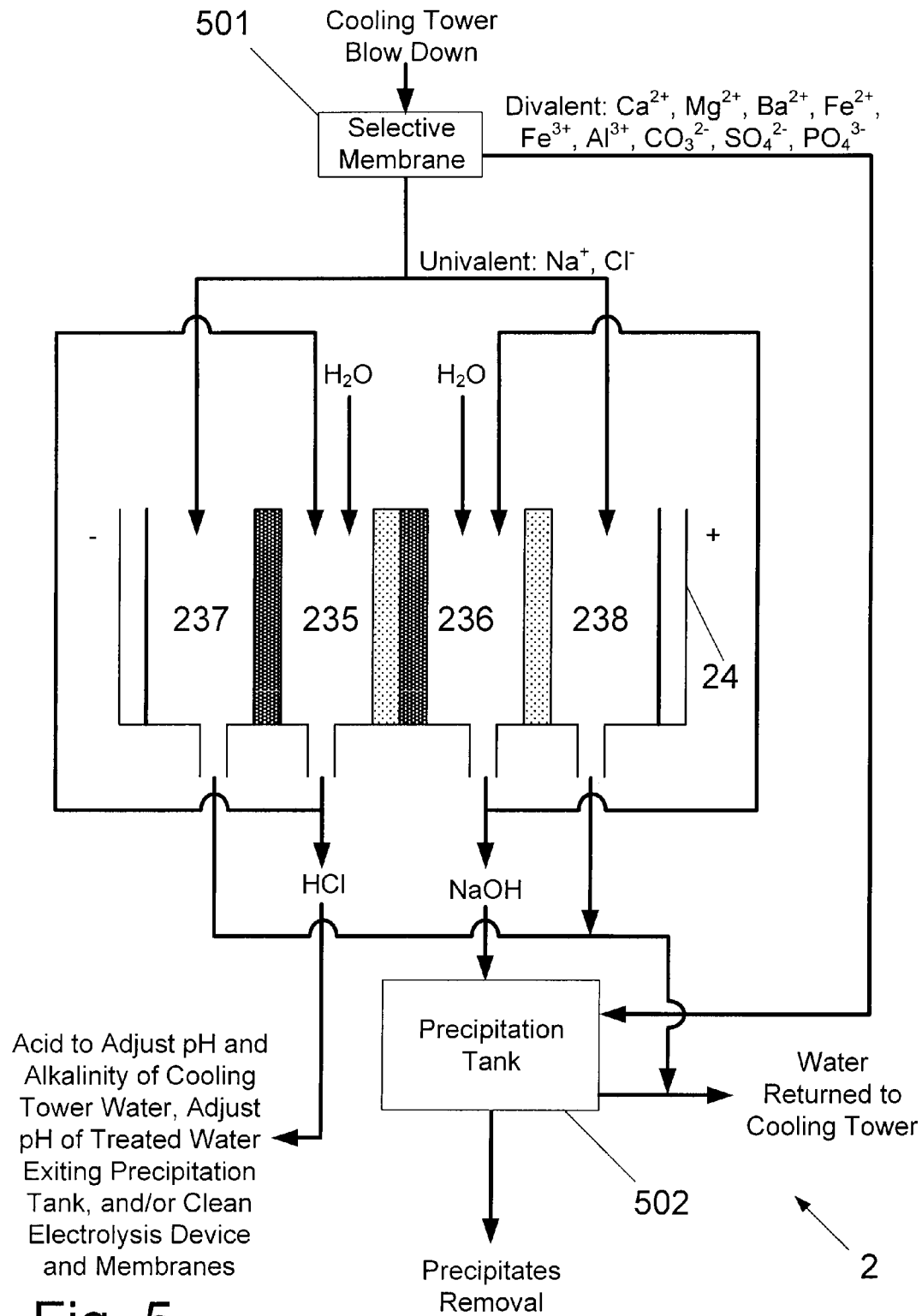
FIG. 5 schematically illustrates a method of operating bipolar membrane of FIG. 1.

Further, as is shown in FIG. 5, it is also contemplated that in some embodiments all or part of the acidic solution output of acidic chamber 235 can be returned to acidic chamber 235 as a feed stream. Further, all or part of the alkalic solution output of alkalic chamber 236 can be returned to alkalic chamber 236 as a feed stream. This would allow for the concentration of acid and base solutions to be increased with time within acidic chamber 235 and alkalic chamber 236. Additionally, the output of salt chambers 237 and 238 is combined with the remaining treated water from the precipitation tank after precipitate removal as cooling tower make up water or for other industrial processes.

Figure 6:
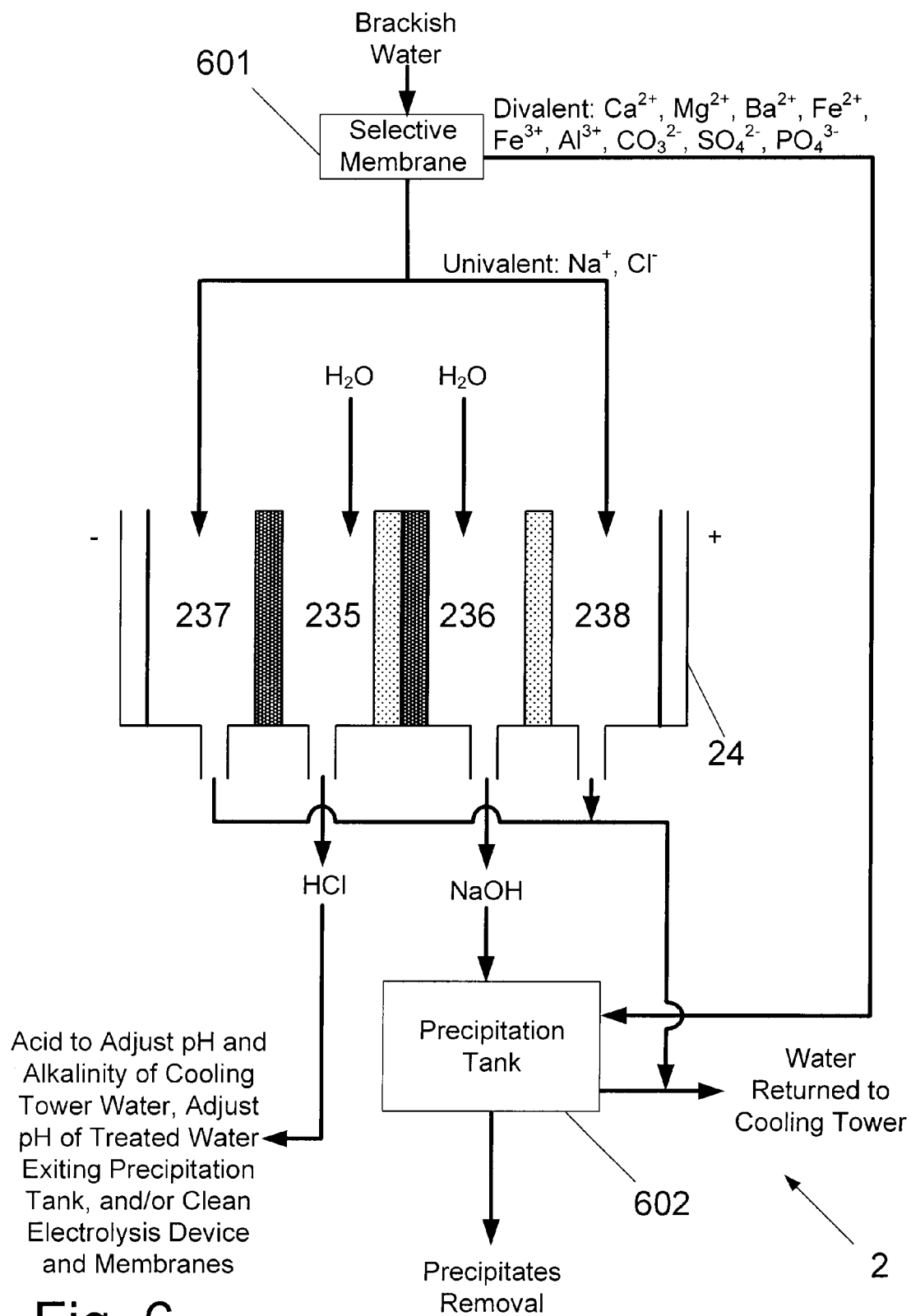
FIG. 6 schematically illustrates a method of operating bipolar membrane of FIG. 1.

FIG. 6 discloses another embodiment in which electrolysis device 2 is used to generate acidic solution for cooling tower water pH adjustment, the cleaning of electrolysis device 2, and/or to generate base for hardness precipitation. In this embodiment, a feed stream of low quality water, such as brackish water, is delivered to selective membrane 601, which outputs a divalent ion stream that is provided to precipitation tank 602. However, it is contemplated that the feed stream can be comprised of at least one of cooling tower make up water, cooling tower blow down, or low quality water. The divalent ion stream contains one or more divalent ions, such as $ca^{2+}$, $mg^{2+}$, $Ba^{2+}$, $Fe^{2+}$, $Fe^{3+}$, $Al^{3+}$, $CO_3^{2-}$, $SO_4^{2-}$, $PO_4^3$, etc. Selective membrane 601 outputs a univalent ion stream that is provided to the first and second salt water chambers 237 and 238 of electrolysis device 2. Selective membrane 601 may be a nanofiltration unit. The univalent ion stream contains one or more univalent ions, such as $Na^+$, $Cl^-$, etc. Further, a water feed stream is provided to the acidic chamber 235 and alkalic chamber 236 of vessel 24.

The output of the alkalic chamber 236 is provided to the precipitation tank 602, which increases the pH in precipitation tank 602 to a desired value to precipitate Ca and Mg salts and metal hydroxides. In one embodiment, the desired pH value in precipitation tank 602 after the addition of alkalic solution from vessel 24 is between about 7 to 14, preferably between about 8 to 13 and more preferably between about 9 to 12. The precipitates are then removed from precipitation tank 602 and the remaining treated water contained in precipitation tank 602 is used as cooling tower make up water or for other industrial processes. The output of first and second salt water chambers 237 and 238 is combined with the remaining treated water from the precipitation tank and used as cooling tower make up water or for other industrial processes. The acidic solution output of the acidic chamber 235 can be used to adjust the pH of cooling tower water, adjust the pH of the treated water stream exiting from precipitation tank 602, and/or clean membranes of vessel 24.

Figure 7:
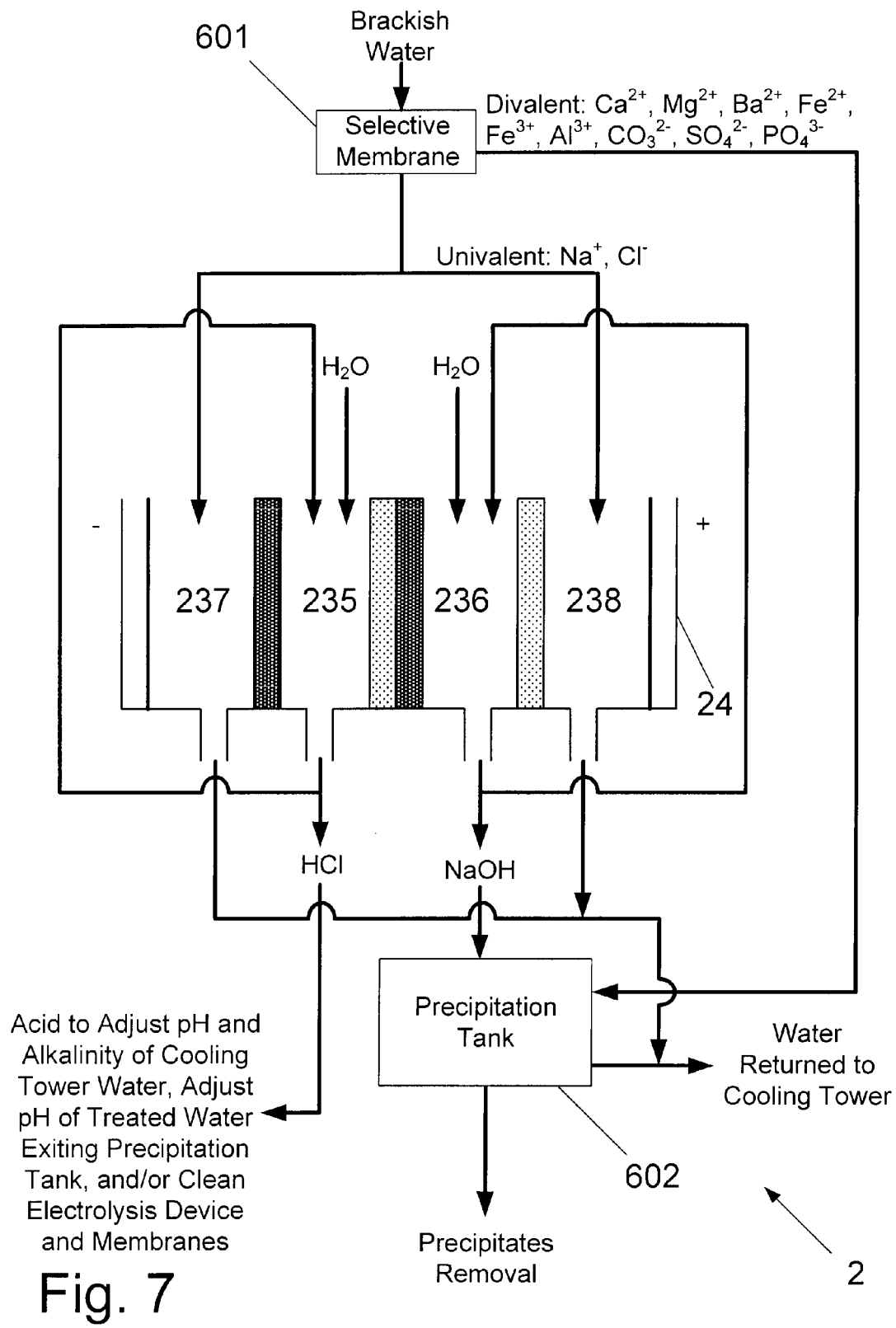
FIG. 7 schematically illustrates a method of operating bipolar membrane of FIG. 1.

Further, as is shown in FIG. 7, it is also contemplated that in some embodiments all or part of the output of acidic chamber 235 can be returned to acidic chamber 235 as a feed stream. Further, all or part of the output of alkalic chamber 236 can be returned to alkalic chamber 236 as a feed stream. This would allow for the concentration of acid solution and base solution to be increased with time within acidic chamber 235 and alkalic chamber 236. The output of first salt water chambers 237 and 238 is combined with the remaining treated water from the precipitation tank and used as cooling tower make up water or for other industrial processes.

Figure 8:
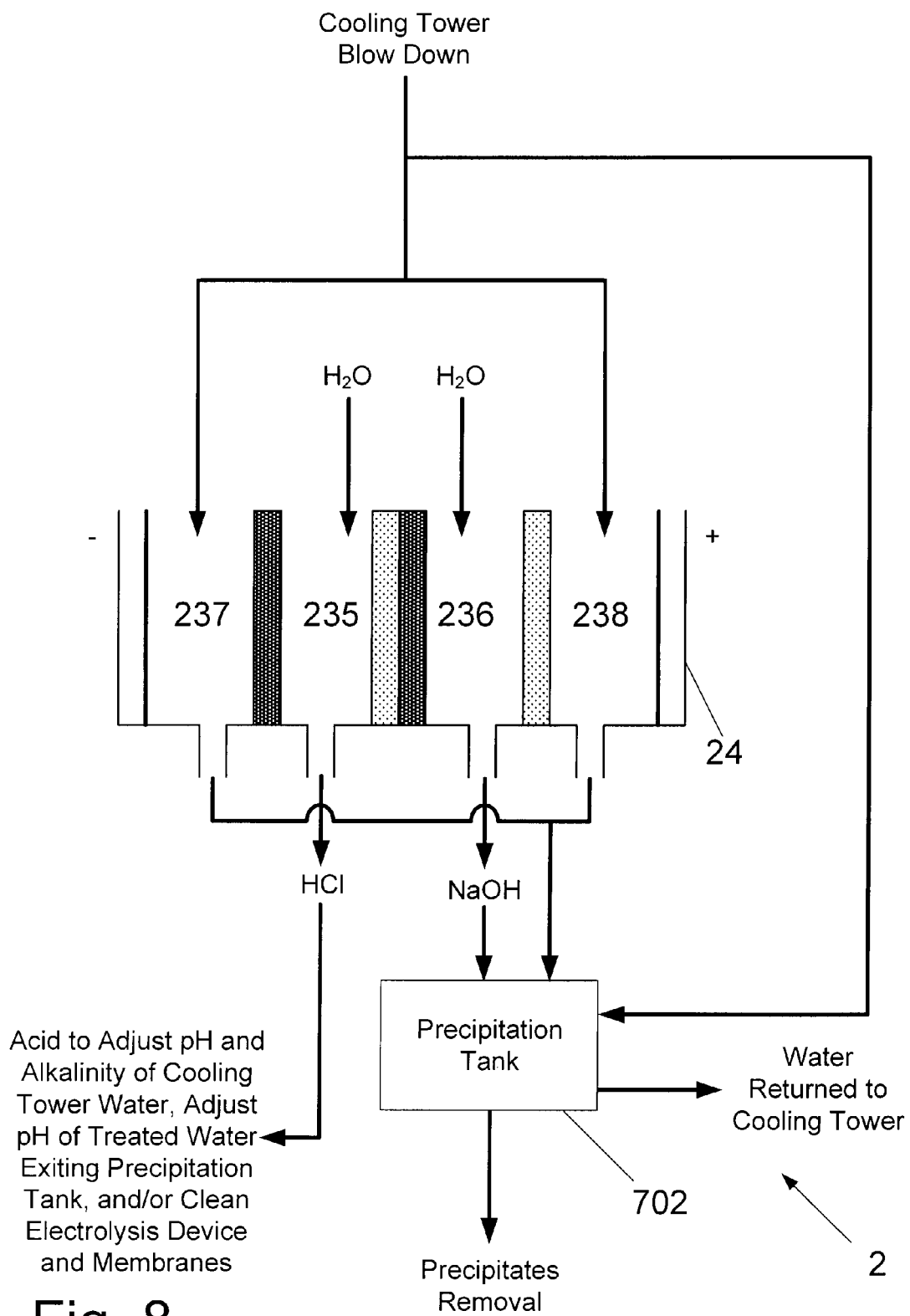
FIG. 8 schematically illustrates a method of operating bipolar membrane of FIG. 1.

Turning to FIG. 8, in one embodiment of this invention, a first portion of blowdown from a cooling tower operating at a high cycle of concentration, greater than about 7 cycles, and pure water are provided to an electrolysis unit. The electrolysis unit uses the first portion of blowdown and pure water to generate an acidic solution in acid chamber 235, an alkalic solution in alkalic chamber 236, and a salt water solution in first and second chambers 237 and 238. The acidic solution is provided to the cooling tower to reduce the alkalinity and pH of the water circulating through the cooling tower. The alkalic solution is mixed with a second portion of blowdown in precipitation tank 702 to precipitate and remove calcium and other scaling forming species from the second portion of blowdown, thereby softening the second portion of blowdown. The softened second portion of blowdown is then returned to the cooling tower as make up water.

In one embodiment, the blowdown is filtered by a nanofiltration unit 701 after leaving the cooling tower. After nanofiltration, the first portion of blowdown is comprised of one or more univalent ions and the second portion of blowdown is comprised of one or more divalent ions. In some embodiments, the salt water solution is added to the softened second portion of blowdown and returned to the cooling tower as makeup water.

While this invention has been described in conjunction with the specific embodiments described above, it is evident that many alternatives, combinations, modifications and variations are apparent to those skilled in the art. Accordingly, the preferred embodiments of this invention, as set forth above are intended to be illustrative only, and not in a limiting sense. Various changes can be made without departing from the spirit and scope of this invention. Therefore, the technical scope of the present invention encompasses not only those embodiments described above, but also all that fall within the scope of the appended claims.

This written description uses examples to disclose the invention, including the best mode, and also to enable any person skilled in the art to practice the invention, including making and using any devices or systems and performing any incorporated processes. The patentable scope of the invention is defined by the claims, and may include other examples that occur to those skilled in the art. These other examples are intended to be within the scope of the claims if they have structural elements that do not differ from the literal language of the claims, or if they include equivalent structural elements with insubstantial differences from the literal language of the claims.

What is claimed is:

1. A method of cooling tower water treatment comprising providing an electrolysis device comprising:
    an electrolysis vessel;
    a pair of electrodes arranged in the electrolysis vessel, the pair of electrodes respectively serving as a positive electrode and a negative electrode; and
    a cell unit arranged between the positive and negative electrodes, the cell unit comprising a bipolar membrane element and at least one cation exchangeable membrane, the bipolar membrane element having a cation exchangeable side and an anion exchangeable side, the cation exchangeable side being closer to the negative electrode than the anion exchangeable side, said at least one cation exchangeable membrane being arranged between the anion exchangeable side of the bipolar membrane element and the positive electrode, so as to define an alkalic chamber between the bipolar membrane element and the cation exchangeable membrane, said cation exchangeable membrane is selective; an anion exchangeable membrane between the negative electrode and the cation exchangeable side of the bipolar membrane element, an acidic chamber being defined between the anion exchangeable membrane and the bipolar membrane element, said anion exchangeable membrane is selective;
    a first salt water chamber defined between said negative electrode and anion exchangeable membrane, a second salt water chamber defined between said positive electrode and said cation exchangeable membrane; and
    a first inlet providing a feed stream to said first salt water chamber, a second inlet providing a feed stream to said second salt water chamber, a third inlet providing a feed stream to said acidic chamber, and a fourth inlet providing a feed stream to said alkalic chamber;
  providing a selective membrane, said selective membrane receives a feed stream comprised of at least one of cooling tower make up water, cooling tower blow down, or low quality water;
  said selective membrane outputs a divalent stream and a univalent stream;
    wherein, said divalent stream is provided to a precipitation tank; said univalent stream is provided to said first salt water chamber and said second salt water chamber; and said acidic and alkalic chambers are provided with an $H_2O$ feed stream; said acidic chamber producing an acidic solution and said alkalic chamber producing an alkalic solution;
  directing at least a portion of the contents of said first and second salt water chambers into a precipitation tank;
  directing at least a portion of the alkalic solution into said precipitation tank, thereby increasing the pH in said precipitation tank to produce precipitate;
  removing said precipitate from said precipitation tank; and
  removing said treated water from said precipitation tank;
    wherein at least a portion of said acidic solution is returned to said acidic chamber as a feed stream.

2. The method of claim 1, wherein at least a portion of said alkalic solution is returned to said alkalic chamber as a feed stream.

3. The method of claim 1, wherein the water treated in said precipitation tank is returned to said cooling tower after said precipitate is removed from said precipitation tank.

4. The method of claim 1, wherein a portion of the acidic solution is provided to said cooling tower.

* * * * *